US010663810B2

(12) United States Patent
Inoue

(10) Patent No.: US 10,663,810 B2
(45) Date of Patent: May 26, 2020

(54) DISPLAY SYSTEM AND METHOD FOR DRIVING DISPLAY

(71) Applicant: Huawei Technologies Co., Ltd., Shenzhen (CN)

(72) Inventor: Masahide Inoue, Tokyo (JP)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 112 days.

(21) Appl. No.: 15/904,012

(22) Filed: Feb. 23, 2018

(65) Prior Publication Data

US 2018/0180914 A1 Jun. 28, 2018

Related U.S. Application Data

(63) Continuation of application No. PCT/CN2015/088269, filed on Aug. 27, 2015.

(51) Int. Cl.
*G02F 1/1343* (2006.01)
*H04M 1/02* (2006.01)
(Continued)

(52) U.S. Cl.
CPC .......... *G02F 1/1343* (2013.01); *G06F 1/1637* (2013.01); *G06F 1/1641* (2013.01);
(Continued)

(58) Field of Classification Search
CPC ........ G02F 1/1343; G06F 1/26; G06F 1/1641; G06F 1/1637; G09G 3/36;
(Continued)

(56) References Cited

U.S. PATENT DOCUMENTS 9,375,874 B2 * 6/2016 Lin .................. B29C 65/08
9,563,264 B1 * 2/2017 Limp ................ G06F 1/1632
(Continued)

FOREIGN PATENT DOCUMENTS

CN 101827169 A 9/2010
CN 201716963 U 1/2011
(Continued)

OTHER PUBLICATIONS

Machine Translation and Abstract of Chinese Publication No. CN201716963, Jan. 19, 2011, 12 pages.
(Continued)

*Primary Examiner* — Grant Sitta
(74) *Attorney, Agent, or Firm* — Conley Rose, P.C.

(57) ABSTRACT

A display system and a method for driving a display, where the display system includes a first device comprising a first display, wherein the first display comprises a first electrode and a second electrode with a display component layer therebetween, and the second electrode is grounded, and a second device comprising a third electrode and an electric voltage source coupling to the third electrode, wherein when an electric voltage is applied to the third electrode by the electric voltage source, the third electrode is capable of inducing electrostatic charges on the first electrode, and a potential difference between the first electrode and the second electrode produced by the electrostatic charges on the first electrode is capable of driving molecules in the display component layer to be re-distributed.

20 Claims, 4 Drawing Sheets

Display side    Third electrode

(51) Int. Cl.
*G06F 1/26* (2006.01)
*G06F 1/16* (2006.01)
*G09G 3/36* (2006.01)
*H04M 1/18* (2006.01)

(52) U.S. Cl.
CPC ............... *G06F 1/26* (2013.01); *G09G 3/36* (2013.01); *H04M 1/0266* (2013.01); *G09G 2310/0264* (2013.01); *G09G 2356/00* (2013.01); *G09G 2360/04* (2013.01); *H04M 1/185* (2013.01)

(58) Field of Classification Search
CPC ....... G09G 2310/0264; G09G 2356/00; G09G 2360/04; H04M 1/0266; H04M 1/185
See application file for complete search history.

(56) References Cited

U.S. PATENT DOCUMENTS

| | | |
|---|---|---|
| 2009/0189851 A1 | 7/2009 | Takenouchi et al. |
| 2010/0227651 A1 | 9/2010 | Kim |
| 2011/0181532 A1* | 7/2011 | Pan ................. G02F 1/167 345/173 |
| 2011/0310085 A1* | 12/2011 | Mimura ............. G06F 3/041 345/214 |
| 2012/0032972 A1* | 2/2012 | Hwang .............. G06F 3/0488 345/592 |
| 2012/0194448 A1* | 8/2012 | Rothkopf ........... H04B 1/3822 345/173 |
| 2013/0050164 A1* | 2/2013 | Rericha ............. G06F 1/1626 345/205 |
| 2013/0076614 A1* | 3/2013 | Ive ................. G06F 1/1677 345/156 |
| 2014/0002365 A1* | 1/2014 | Ackley .............. G09G 5/006 345/168 |
| 2014/0204511 A1* | 7/2014 | Oh .................. G06F 1/1632 361/679.01 |
| 2014/0240299 A1* | 8/2014 | Gila ................ G06F 3/03545 345/179 |
| 2015/0186093 A1* | 7/2015 | Kim ................. G06F 3/14 345/174 |
| 2015/0214282 A1 | 7/2015 | Adachi |
| 2015/0280770 A1* | 10/2015 | Rhee ................ H04B 1/3888 455/575.8 |
| 2016/0179452 A1* | 6/2016 | Huang .............. G02F 1/133603 345/3.1 |
| 2017/0308284 A1* | 10/2017 | Lee ................. G06F 1/1647 |

FOREIGN PATENT DOCUMENTS

| | | |
|---|---|---|
| EP | 2905694 A1 | 8/2015 |
| JP | 2010266837 A | 11/2010 |
| WO | 2015026131 A1 | 2/2015 |

OTHER PUBLICATIONS

Machine Translation and Abstract of Japanese Publication No. JP2010266837, Nov. 25, 2010, 18 pages.
Foreign Communication From a Counterpart Application, PCT Application No. PCT/CN2015/088269, English Translation of International Search Report dated Jun. 3, 2016, 8 pages.
Foreign Communication From a Counterpart Application, PCT Application No. PCT/CN2015/088269, English Translation of Written Opinion dated Jun. 3, 2016, 5 pages.
Machine Translation and Abstract of International Publication No. WO2015026131, Feb. 26, 2015, 53 pages.
Foreign Communication From a Counterpart Application, European Application No. 15902029.6, Extended European Search Report dated Jul. 19, 2018, 8 pages.

* cited by examiner

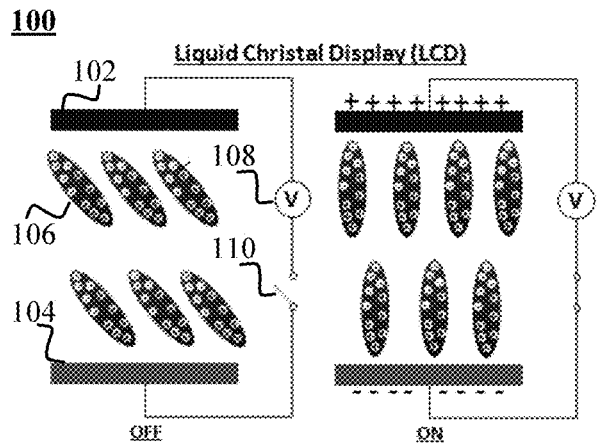

FIG. 1 PRIOR ART

```
┌─────────────────────────────────────────────────┐
│ coupling a voltage source to an external electrode, so as │  S210
│ to enable the external electrode to carry charges │
└─────────────────────────────────────────────────┘
                          │
┌─────────────────────────────────────────────────┐
│ providing the external electrode to the nearby of the first │  S220
│ electrode of the display, so as to enable the charges on │
│ the external electrode to induce electrostatic charges on │
│ the first electrode, wherein the second electrode of the │
│ display is grounded │
└─────────────────────────────────────────────────┘
```

FIG. 2

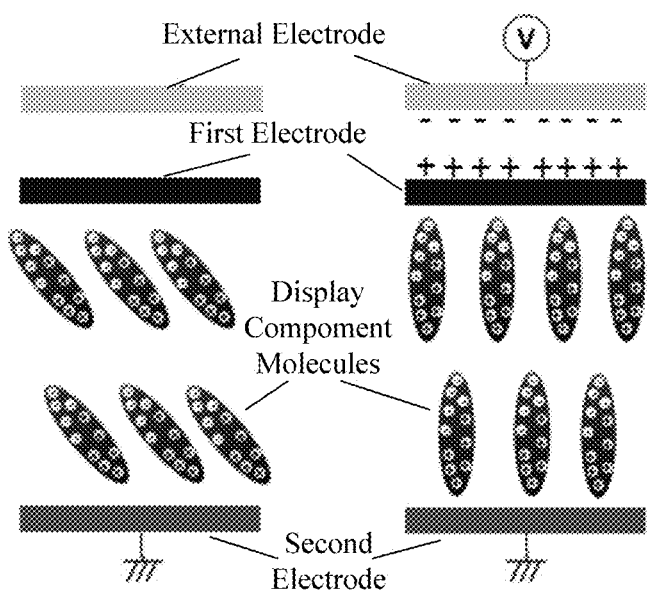

FIG. 3

DISPLAY SYSTEM AND METHOD FOR DRIVING DISPLAY

CROSS-REFERENCE TO RELATED APPLICATION

This application is a continuation of International Patent Application No. PCT/CN2015/088269 filed on Aug. 27, 2015, which is hereby incorporated by reference in its entirety.

TECHNICAL FIELD

The present disclosure relates generally to display devices, and in particular, to a display system and a method for driving a display.

BACKGROUND

A normal display device is usually driven by a power source and a driving circuit directly. In this case, if an electronic device is provided with multiple displays, multiple power sources or complex driving circuits for driving the multiple displays need to be configured, which increase the size or circuit complexity of the electronic device.

SUMMARY

The present disclosure provides a display system and a method for driving a display, in which a display is driven by electrostatic induction without being connected to a power source.

In a first aspect, a display system is provided, including a first device including a first display, wherein the first display includes a first electrode and a second electrode with a display component layer therebetween, and the second electrode is grounded, and a second device including a third electrode and a voltage source coupling to the third electrode, wherein when an electric voltage is applied to the third electrode by the power source, the third electrode is capable of inducing electrostatic charges on the first electrode, and a potential difference between the first electrode and the second electrode produced by the electrostatic charges on the first electrode is capable of driving molecules in the display component layer to be re-distributed.

In a first possible implementation of the first aspect, the third electrode is in parallel with the first electrode with an electric insulation layer therebetween, and the first electrode is arranged between the second electrode and the third electrode.

In accordance with the above-mentioned implementation, in a second possible implementation of the first aspect, the electric insulation layer is an air gap.

In accordance with any one of the above-mentioned implementations, in a third possible implementation of the first aspect, the second electrode is a transparent electrode.

In accordance with any one of the above-mentioned implementations, in a fourth possible implementation of the first aspect, the second electrode is a transparent electrode.

In accordance with any one of the above-mentioned implementations, in a fifth possible implementation of the first aspect, the first display is a liquid crystal display (LCD) or an electrophoretic display.

In accordance with any one of the above-mentioned implementations, in a sixth possible implementation of the first aspect, the second device is a terminal, the terminal further including a second display driven by the power source, and the first device is a device cover configured to cover at least one surface of the terminal.

In accordance with any one of the above-mentioned implementations, in a seventh possible implementation of the first aspect, the third electrode is located at the display side or backside of the terminal towards the first electrode.

In a second aspect, a method for driving a display is provided, where the display includes a first electrode and a second electrode with a display component layer therebetween, and the method includes applying an electric voltage to an external electrode in order to enable the external electrode to carry electric charge, and disposing the external electrode to the nearby of the first electrode of the display in order to enable the electric charge on the external electrode to induce electrostatic charges on the first electrode, and a potential difference between the first electrode and the second electrode produced by the electrostatic charges on the first electrode is capable of driving molecules in the display component layer to be re-distributed, wherein the second electrode is grounded.

In a first possible implementation of the second aspect, disposing the external electrode to the nearby of the first electrode of the display, includes disposing the external electrode to be in parallel with the first electrode, wherein the first electrode is arranged between the second electrode and the external electrode.

In accordance with the above-mentioned implementation, in a second possible implementation of the second aspect, the method further includes disposing an electric insulation layer between the external electrode and the first electrode.

In accordance with any one of the above-mentioned implementations, in a third possible implementation of the second aspect, the electric insulation layer is an air gap.

In accordance with any one of the above-mentioned implementations, in a fourth possible implementation of the second aspect, the second electrode is a transparent electrode.

In accordance with any one of the above-mentioned implementations, in a fifth possible implementation of the second aspect, the display is an LCD or an electrophoretic display.

Based on the foregoing technical solutions of the present disclosure, when a voltage is applied to the third electrode by the power source, the third electrode is capable of inducing electrostatic charges on the first electrode, the electrostatic charges on the first electrode produces a potential difference between the first electrode and the second electrode being grounded, and the potential difference is capable of driving molecules in the display component layer to be re-distributed, which in turn drives the first display to display.

BRIEF DESCRIPTION OF DRAWINGS

To illustrate the technical solutions in the embodiments of the present disclosure more clearly, a brief introduction on the accompanying drawings needed in the description of the embodiments is given below. The accompanying drawings in the description below are merely some examples of the present disclosure, based on which other drawings may also be obtained by those of ordinary skill in the art without any inventive efforts.

FIG. 1 illustrates a conventional driving mechanism of an LCD;

FIG. 2 illustrates a method for driving a display provided by an embodiment of the present disclosure;

FIG. 3 depicts a driving mechanism of an LCD using the method provided by the present disclosure;

DESCRIPTION OF EMBODIMENTS

Figure 4:
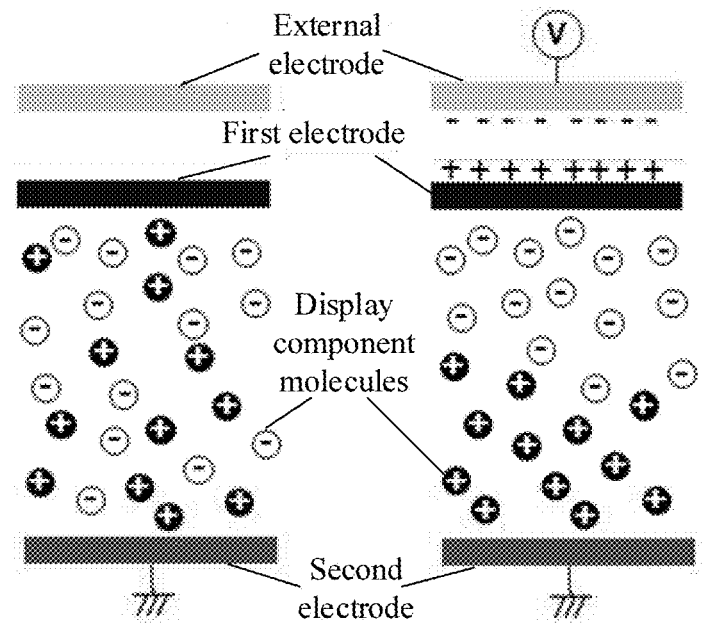
FIG. 4 depicts a driving mechanism of an electrophoretic display using the method provided by the present disclosure.

Hereinafter, a clear description of technical solutions of the embodiments of the present disclosure will be given below, in combination with the accompanying drawings in the embodiments of the present disclosure. The embodiments described below are merely a part, but not all, of the embodiments of the present disclosure. All of other embodiments, obtained by those skilled in the art based on the embodiments of the present disclosure without any inventive efforts, fall into the protection scope of the present disclosure.

FIG. 1 illustrates a conventional driving mechanism of an LCD. A display system 100 shown in FIG. 1 includes an LCD, a source voltage 108, and a driving circuit with a switch 110. The LCD includes a first electrode 102, a second electrode 104 and a liquid crystal layer 106 between the first electrode 102 and the second electrode 104. When the switch 110 is off, no voltage is applied between the first electrode 102 and the second electrode 104, and liquid crystal molecules in the liquid crystal layer 106 are arranged in a steady state (OFF state), which is defined by the design of Liquid Crystal mode. In this case, light incident on the LCD is a polarized light after passing through the liquid crystal layer 106, and is controlled to be able to (or not able to) pass through a polarizing plate (not shown) of the LCD.

While the switch 110 is on, a voltage is applied between the first electrode 102 and the second electrode 104 by the source voltage 108, which produces an electric field therebetween. In this case, the liquid crystal molecules are aligned in accordance with the electric field, and the light incident on the LCD is in another polarization state after passing through the liquid crystal layer 106, and is alternatively controlled to be not able to (or able to) pass through the polarizing plate of the LCD.

The conventional driving method is not applicable to passive display devices. For instance, a handheld device such as a smart phone is usually covered by an opaque protective cover. If such protective cover is provided with an additional display in order to demonstrate a simple indication, such as time, an incoming call, a missing call, a received text, etc, additional power source and driving circuit are needed, which makes the protective cover complex and expensive and is thus impracticable.

The present disclosure provides a method for driving a display by electrostatic induction, which is able to drive a display not being connected to a power source for providing electrical energy, such as a battery or the like. Unlike other approaches in which a power source directly provides an electric voltage between the first electrode and the second electrode via a driving circuit, in the method provided by the present disclosure, the electric voltage between the first electrode and the second electrode is produced by electrostatic charges on the first electrode induced by an external electrode.

It should be appreciated that the present disclosure is applicable to the protective cover as mentioned above, but is also applicable to other display scenarios, such as a film with a display covered on an identification card, etc.

FIG. 2 depicts a method 200 for driving a display provided by an embodiment of the present disclosure. The display includes a first electrode and a second electrode with a display component layer therebetween. The display may be an LCD, an electrophoretic display, an electronic ink display, etc. Referring to FIG. 2, the method 200 includes the following steps.

Step S210: Applying an electric voltage to an external electrode in order to enable the external electrode to carry electric charge.

Step S220: Disposing the external electrode to the nearby of the first electrode in order to enable the electric charge on the external electrode to induce electrostatic charges on the first electrode, and a potential difference between the first electrode and the second electrode produced by the electrostatic charges on the first electrode is capable of driving molecules in the display component layer to be re-distributed, wherein the second electrode of the display is grounded.

In step S210, there are a variety of means to apply an electric voltage to the external electrode. For example, the external electrode may be coupled to a power source, i.e., directly connected to a power source or connected to a power source via one or more other components. Alternatively, the electric voltage may be applied to the external electrode by other means, which is not limited by the present disclosure.

In the method 200, the execution order of steps S210 and S220 is not limited, that is, these two steps may be executed simultaneously or in any sequence, as long as to guarantee the occurrence of the electrostatic induction.

The second electrode is grounded. There are various means to make the second electrode to be grounded. For instance, the second electrode may be grounded by being connected to a grounded object, or the second electrode may be grounded by being touched by a grounded person, etc. The present disclosure does not set limitation to the means for grounding the second electrode.

Further, the second electrode may be a transparent electrode, and the first electrode may be a transparent electrode or an opaque electrode, which is not limited by the present disclosure.

The first electrode and/or the external electrode may be conductive. For instance, at least one of the first electrode and the external electrode may be made of metal, conductive polymer, conductive plastic, or the like. Additionally, the external electrode may be a metal electrode such as a metal wire and the like.

The external electrode and the first electrode may be close enough to guarantee the occurrence of the electrostatic induction. The voltage imposed on the external electrode and the arrangement of the first electrode and the external electrode may be dependent on the desired electric field to be produced between the first electrode and the second electrode, which are not limited by the present disclosure.

As an alternative, an electric insulation layer may be present between the first electrode and the external electrode, for example, the electric insulation layer may be an air gap, and the present disclosure does not limit the implementation of the electric insulation layer.

The method 200 can be understood by referring to FIG. 3 and FIG. 4. In FIG. 3, the display is an LCD. The LCD includes a first electrode, a second electrode and a liquid crystal layer between the first electrode and the second electrode. The external electrode is separately disposed from an LCD, and the external electrode may be connected to a power source via a driving circuit. When an electric voltage is applied to the external electrode, the external electrode may carry positive or negative charge, and while the charged external electrode is approaching the first electrode, electrostatic induction phenomenon occurs, and opposite charge (i.e., negative or positive charge) is induced on the surface of the first electrode. Since the second electrode is grounded, the electrostatic charges on the first electrode may produce a potential difference between the first electrode and the second electrode, which in turn drives an alignment direction of display component molecules (i.e., liquid crystal molecules) in the display component layer to be changed, and light incident on the display is thus controlled to be able to pass through the LCD.

The working principle of FIG. 4 is similar to that of FIG. 3, except that the display is an electrophoretic display in FIG. 4. When the induced charges on the first electrode produce a potential difference between the first electrode and the second electrode, display component molecules (i.e., charged ions) in the display component layer are driven to be redistributed, which in turn is capable of controlling the light incident on the display to be able to reflect at the display or pass through the display.

In FIG. 3 and FIG. 4, the external electrode may be disposed to be parallel with the first electrode and provided right above the first electrode, and the first electrode is located between the external electrode and the second electrode. It should be appreciated that, in the present disclosure, the external electrode may be moved to the left to right side of the first electrode, or arranged at any other location near the first electrode, as long as the electric charge on the external electrode are able to induce electrostatic charges on the first electrode.

Additionally, FIG. 3 and FIG. 4 exemplarily depict that the external electrode with negative charge induces positive charge on the first electrode. However, the first electrode may also carry positive charge and induce negative charge on the first electrode, which is not limited by the present disclosure.

It should be noted that, the redistribution of molecules in the display component layer may indicate a change in alignment direction of molecules in the display component layer as shown in FIG. 3, or indicate a change in positions of a plurality of molecules in the display component layer as shown in FIG. 4, but the present disclosure does not limit thereto, and the method 200 is also applicable to other types of display.

According to the method provided by the present disclosure, by inducing electrostatic charges on the first electrode by a charged external electrode, a potential difference is produced between the first electrode and the grounded second electrode, which in turn drives the display to function.

Moreover, compared with the other approaches in which the display is directly driven by a source power via a driving circuit, the method provided by the embodiment of the present disclosure can drive a display without connecting the display to a power source, and two or more displays can share a same power source, thereby reducing manufacturing cost—and complexity of the display device.

Figure 5:
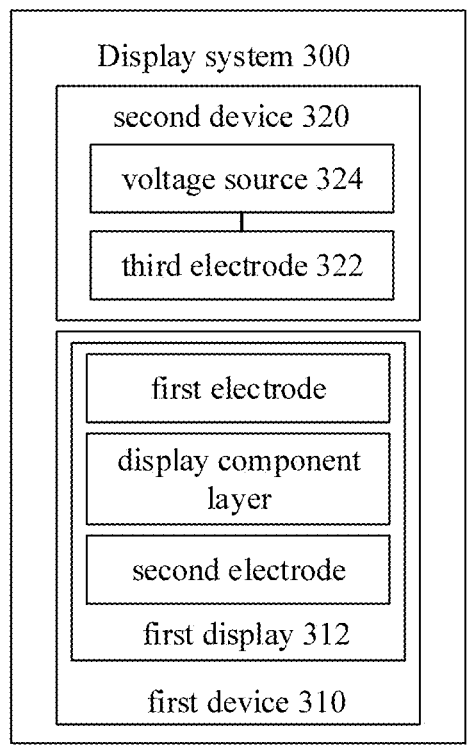
FIG. 5 illustrates a display system provided by an embodiment of the present disclosure.

FIG. 5 illustrates a display system 300 provided by an embodiment of the present disclosure. The display system 300 includes a first device 310 including a first display 312, wherein the first display 312 includes a first electrode and a second electrode with a display component layer therebetween, and the second electrode is grounded, and a second device 320 including a third electrode 322 and a voltage source 324 coupling to the third electrode 322, wherein when an electric voltage is applied to the third electrode 322 by the power source, the third electrode 322 is capable of inducing electrostatic charges on the first electrode, and a potential difference between the first electrode and the second electrode produced by the electrostatic charges on the first electrode is capable of driving molecules in the display component layer to be re-distributed.

Further, the first display 312 is driven by the potential difference between the first electrode and the second electrode arisen by electrostatic charges on the first electrode, and the electrostatic charges are induced by the third electrode 322 to which a voltage is imposed by the voltage source 324. The third electrode 322 and the first electrode may be close enough to enable to occurrence of the electrostatic induction. As an alternative, the third electrode 322 is in parallel with the first electrode with an electric insulation layer therebetween, and the first electrode is disposed between the second electrode and the third electrode 322.

The electric insulation layer may be an air gap, that is, there is an air gap between the first electrode and the third electrode 322. Alternatively, the electric insulation layer may be composed of other components, and the present disclosure does not set limitation to the composition of the electric insulation layer.

The third electrode 322 may correspond to the external electrode in the above-mentioned method embodiment, and the first display may correspond to the display device in the above-mentioned method embodiment. The foregoing description may be referred to for the driving principle of the first display 312, which will not be described in detail herein.

In some aspects, the display system 300 may further include a terminal with a cover covering at least one surface of the terminal. Correspondingly, the second device is a terminal, and the first device is a device cover configured to cover at least one surface of the terminal.

The terminal is an electric device. The terminal may be a portable terminal or other suitable terminal. For example, the terminal may be a laptop computer, a tablet computer, a somewhat smaller device such as a wrist-watch device, pendant device, a headphone device, an earpiece device, or other wearable or miniature device, a cellular telephone, or a media player. The terminal may also be a television, a set-top box, a desktop computer, a computer monitor into which a computer has been integrated, or other suitable electronic equipment.

The terminal may include a case (may sometimes referred to as a shell or housing), and the case may be formed of plastic, glass, ceramics, fiber composites, metal, other suitable materials, or a combination thereof. The terminal may also have a second display.

The first display 312 may include image pixels formed from LCD components, electrophoretic pixels, electrowetting pixels, or other suitable image pixel structures. The second display may include image pixels formed from light emitting diodes (LEDs), organic LEDs (OLEDs), plasma cells, electrowetting pixels, electrophoretic pixels, LCD components, or other suitable image pixel structures. The power source in the terminal is used for driving the second display, and further, the second display may be connected to the power source with a driving circuit. Additionally, the power source may be coupled to the third electrode 322, that is, the power source may be directly connected to the third electrode 322 or connected to the third electrode 322 via one or more other components.

The cover may be a passive device, and may be used for covering at least one surface of the terminal. The at least one surface includes a target surface near which the third electrode 322 is located. For example, the cover may be configured to cover the front surface of the terminal, i.e., a surface including a display, the back surface of the terminal, and/or the side surface of the terminal.

When the cover is covered on the surface on which or near which the third electrode 322 is located, the third electrode 322 in the terminal and the first electrode in the cover are close enough to enable electrostatic induction to be happened.

The cover may be made of plastic, ceramics, fiber composites, metal, other suitable materials, or a combination thereof. Additionally, at least part of the cover may be rotatable with respect to the terminal, but not limitation is set herein.

Figure 6:
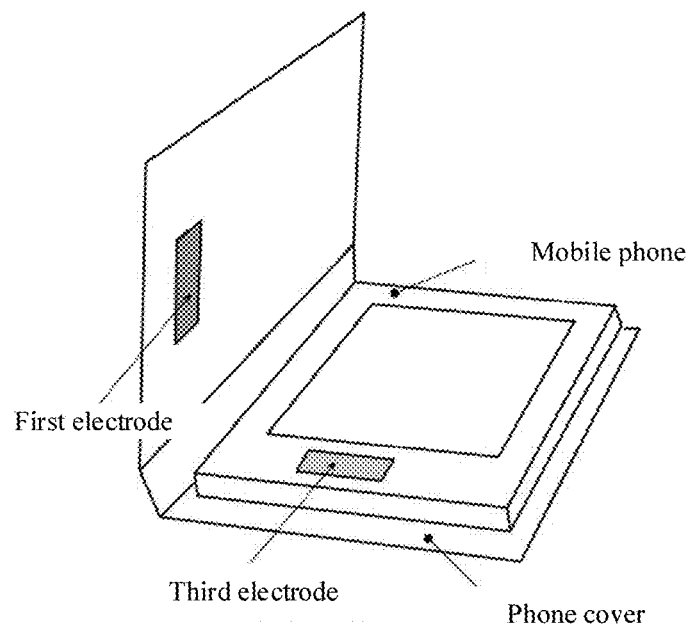
FIG. 6 illustrates an example of the display system in FIG. 5.
Figure 7:
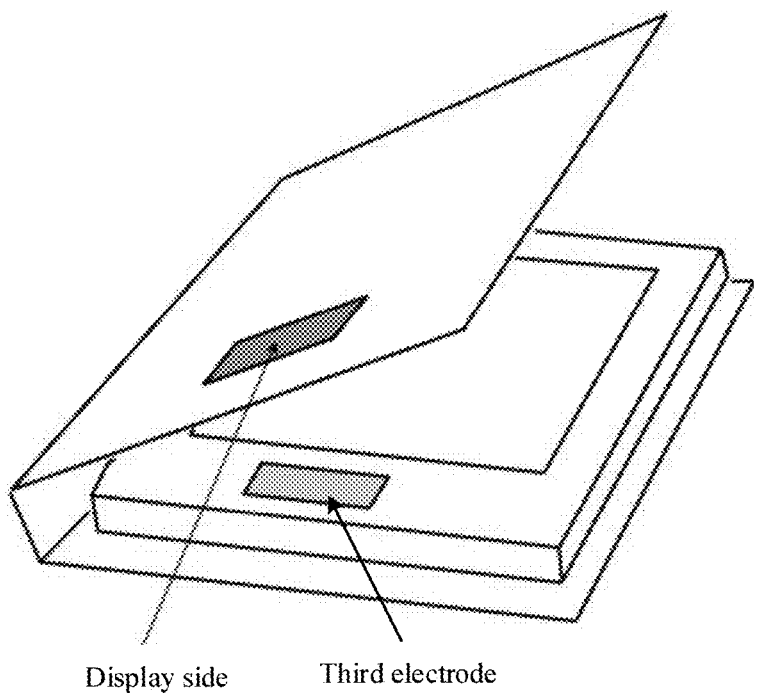
FIG. 7 illustrates another perspective view of the example in FIG. 6.

Alternatively, the terminal may be a mobile phone, a tablet computer, a pad, or the like. FIG. 6 and FIG. 7 exemplarily depict a mobile phone with a phone cover on it. The mobile phone has a main display (i.e., the second display) driven by the power source, and includes a third electrode on a front surface where the main display is located. Alternatively, the third electrode may be disposed on or beneath the front surface or at the backside of the mobile phone, and may be provided at anywhere near the sub-display in the phone cover. The third electrode may be made of transparent conductive material (e.g., Indium Tin Oxide (ITO)), but no limitation is set herein.

The phone cover may be a passive opaque device, and includes a sub-display (i.e., the first display) near the display side or backside of the mobile phone. The sub-display may be smaller than the main display, and is used for displaying simple indications such as time, missed calls, incoming calls or short messages, etc.

Figure 8:
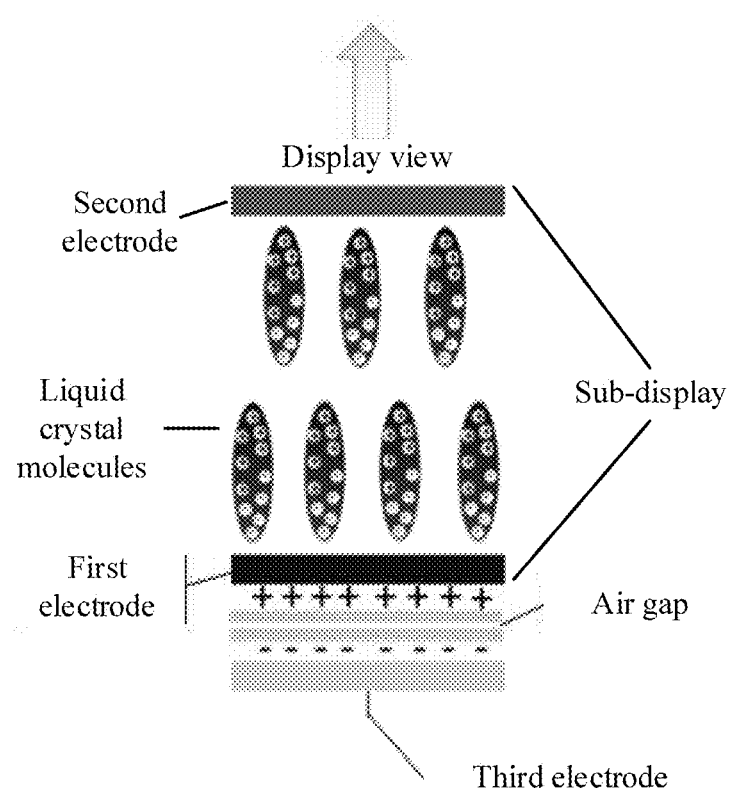
FIG. 8 illustrates the driving principle of the sub-display in FIG. 6 and FIG. 7.

Referring to FIG. 6, the sub-display includes a first electrode facing to the mobile phone and an opposed display component. As shown in FIG. 8, the display system includes a sub-display including a first electrode, a second electrode disposed near the display surface of the sub-display, and an liquid crystal layer between the first electrode and the second electrode, a third electrode is arranged near the first electrode with an air gap therebetween. When the power source (not shown) in the mobile phone applies an electric voltage to the third electrode, and the phone cover is covered on the mobile phone as shown in FIG. 8, the charged third electrode would induce electrostatic charges on the first electrode, which in turn produce an electric field between the first electrode and the second electrode, and the alignment direction of liquid crystal molecules are changed in accordance with the electric field, thereby driving the sub-display to allow the incident light to pass there through.

In some aspects of the present disclosure, the mobile phone may also include an electrostatic discharge (ESD) protection circuit in order to prevent the main display from interfered by the third electrode.

Therefore, according to the display system provided by the present disclosure, when a voltage is applied to the third electrode by the power source, the third electrode is capable of inducing electrostatic charges on the first electrode, the electrostatic charges on the first electrode produces a potential difference between the first electrode and the second electrode being grounded, and the potential difference is capable of driving molecules in the display component layer to be re-distributed, which in turn drives the first display to display without introducing additional power source and driving circuit for the first display.

It should be appreciated that the term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concept in a concrete fashion. As used in the present disclosure, the term "and/or" is intended to mean an inclusive "and/or." That is, unless specified otherwise, or clear from context, "X includes A and/or B" is intended to mean any of natural inclusive permutations, i.e., X may be A, or X may be B, or X may be A and B.

Various embodiments are described in the general context of method steps or processes, which may be implemented in one embodiment by a computer program product, embodied in a computer-readable memory, including computer-executable instructions, such as program code, executed by computers in networked environments. A computer-readable memory may include removable and non-removable storage devices including, but not limited to, read only memory (ROM), random access memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions describes in such steps or processes. Various embodiments may include a computer-readable medium including computer executable instructions which, when executed by a processor, cause an apparatus to perform the methods and processors described herein.

Embodiments of the present disclosure may be implemented in software, hardware, application logic or a combination thereof. The software, application logic and/or hardware may reside on a user device, or a controller, such as a content server or a controller. In an exemplary embodiment, the application logic, software or an instruction set is maintained on any one of various conventional computer-readable media. In the context of the present disclosure, the term "computer-readable medium" may be any media or means that can contain, store, communicate, propagate or transport the instructions for use by or in connection with an instruction execution system, apparatus or device, such as a computer.

In the end, it should be noted that the preceding embodiments are merely used to illustrate the technical solutions of the present disclosure rather than limiting the present disclosure. Though the present disclosure is illustrated in detail by referring to the preceding embodiments, it should be understood by one of skill in the art that modifications may still be made on the technical solutions disclosed in the preceding respective embodiments, or equivalent alterations may be made to a part of technical characteristics thereof, and these modifications or alterations do not make the nature of corresponding technical solutions departure from the spirit and scope of the technical solutions of the respective embodiments of the present disclosure.

What is claimed is:

1. A display system, comprising:
a first device comprising a first display, wherein the first display comprises a first electrode and a second electrode with a display component layer therebetween, and wherein the second electrode is grounded; and
a second device comprising a second display and a third electrode both directly coupled to a voltage source,
wherein the first device and the second device are configured such that the first display is positionable to cover the third electrode,
wherein the third electrode is configured to induce electrostatic charges on the first electrode when an electric voltage is applied to the third electrode from the voltage source while the first display is positioned to cover the third electrode,
wherein the first electrode and the second electrode are configured such that a potential difference between the first electrode and the second electrode produced by the electrostatic charges drives molecules in the first display component layer to be re-distributed, and
wherein the second display is configured to be driven directly by the voltage source.

2. The display system according to claim 1, wherein while the first display is positioned to cover the third electrode, the third electrode is in parallel with the first electrode with an electric insulation layer therebetween, and wherein the first electrode is arranged between the second electrode and the third electrode.

3. The display system according to claim 2, wherein the electric insulation layer comprises an air gap.

4. The display system according to claim 1, wherein the second electrode comprises a transparent electrode.

5. The display system according to claim 1, wherein the first display comprises a liquid crystal display (LCD).

6. The display system according to claim 1, wherein the first display comprises an electrophoretic display.

7. The display system according to claim 1, wherein the second device comprises a terminal, and wherein the first device comprises a cover configured to cover at least one surface of the terminal.

8. The display system according to claim 7, wherein the third electrode is located at a display side of the terminal facing toward the first electrode.

9. The display system according to claim 7, wherein the third electrode is located at a backside of the terminal facing toward the first electrode.

10. A method for driving a display system, wherein a first display comprises a first electrode and a second electrode with a display component layer therebetween, wherein the second electrode is grounded, wherein a voltage source is coupled to a second display and an external electrode, and wherein the method comprises:

positioning the first display overlapping the external electrode;
applying an electric voltage to the external electrode in order to enable the external electrode to carry electric charge;
disposing the external electrode proximate to the first electrode in order to enable the electric charge on the external electrode to induce electrostatic charges on the first electrode, wherein a potential difference between the first electrode and the second electrode produced by the electrostatic charges on the first electrode drives molecules in the first display component layer to be re-distributed; and
driving the second display from the voltage source.

11. The method according to claim 10, wherein disposing the external electrode proximate to the first electrode of the first display comprises disposing the external electrode to be in parallel with the first electrode, and wherein the first electrode is arranged between the second electrode and the external electrode.

12. The method according to claim 10, further comprising disposing an electric insulation layer between the external electrode and the first electrode.

13. The method according to claim 12, wherein the electric insulation layer comprises an air gap.

14. The method according to claim 10, wherein the second electrode comprises a transparent electrode.

15. The method according to claim 10, wherein the display comprises a liquid crystal display (LCD).

16. The method according to claim 10, wherein the display comprises an electrophoretic display.

17. The display system according to claim 1, wherein the second device comprises a mobile telephone further comprising a second display driven from the voltage source, and wherein the first device comprises a cover configured to cover at least one surface of the mobile telephone.

18. The display system according to claim 1, wherein the second device comprises a tablet computer further comprising a second display driven from the voltage source, and wherein the first device comprises a cover configured to cover at least one surface of the tablet computer.

19. The display system according to claim 1, wherein the second device comprises a wearable device further comprising a second display driven from the voltage source, and wherein the first device comprises a cover configured to cover at least one surface of the wearable device.

20. The display system according to claim 1, wherein the second device comprises a media player further comprising a second display driven from the voltage source, and wherein the first device comprises a cover configured to cover at least one surface of the media player.

* * * * *